US009438003B2

(12) United States Patent
Schad et al.

(10) Patent No.: US 9,438,003 B2
(45) Date of Patent: Sep. 6, 2016

(54) SOLID-STATE LASER

(71) Applicant: TRUMPF LASER GMBH, Schramberg (DE)

(72) Inventors: Sven-Silvius Schad, Rottweil (DE); Elke Dolores Kaiser, Aichhalden (DE)

(73) Assignee: TRUMPF LASER GMBH, Schramberg (DE)

( * ) Notice: Subject to any disclaimer, the term of this patent is extended or adjusted under 35 U.S.C. 154(b) by 0 days.

(21) Appl. No.: 14/628,772

(22) Filed: Feb. 23, 2015

(65) Prior Publication Data

US 2015/0171586 A1 Jun. 18, 2015

Related U.S. Application Data

(63) Continuation of application No. PCT/EP2013/067085, filed on Aug. 15, 2013.

(30) Foreign Application Priority Data

Aug. 23, 2012 (DE) ......................... 10 2012 214 971

(51) Int. Cl.
*H01S 3/042* (2006.01)
*H01S 3/06* (2006.01)
*H01S 3/04* (2006.01)
*H01S 3/094* (2006.01)

(52) U.S. Cl.
CPC ............. *H01S 3/042* (2013.01); *H01S 3/0405* (2013.01); *H01S 3/0604* (2013.01); *H01S 3/0621* (2013.01); *H01S 3/094084* (2013.01)

(58) Field of Classification Search
CPC .... H01S 3/042; H01S 3/0604; H01S 3/0612; H01S 3/0405; H01S 3/094084
See application file for complete search history.

(56) References Cited

U.S. PATENT DOCUMENTS 4,914,670 A * 4/1990 Nishizawa ............. H01S 5/125
372/50.11
5,480,835 A * 1/1996 Carney .................. H01L 24/11
205/125

(Continued)

FOREIGN PATENT DOCUMENTS

DE 4344227 A1 1/1995
DE 10005195 A1 8/2001

(Continued)

OTHER PUBLICATIONS

Notification of Transmittal of Translation of International Preliminary Report on Patentability and Written Opinion of the International Searching Authority for corresponding PCT Application No. PCT/EP2013/067085, mailed Mar. 5, 2015, 12 pages.

(Continued)

*Primary Examiner* — Xinning Niu
(74) *Attorney, Agent, or Firm* — Fish & Richardson P.C.

(57) ABSTRACT

A solid-state laser arrangement includes a plate-like solid body including a laser-active medium, a heat sink, a layer of adhesive between a carrier face of the heat sink and the plate-like solid body, and a reflective coating on a side of the plate-like solid body facing the adhesive layer, in which the adhesive layer is completely shielded from radiation from the plate-like solid body by a radiation-impermeable region between the side of the plate-like solid body facing the adhesive layer and the carrier face of the heat sink.

17 Claims, 1 Drawing Sheet

(56) References Cited

U.S. PATENT DOCUMENTS

| | | | |
|---|---|---|---|
| 5,553,088 A | 9/1996 | Brauch et al. | |
| 6,738,399 B1* | 5/2004 | Albrecht | H01S 3/042 372/11 |
| 7,724,800 B2 | 5/2010 | Sumida et al. | |
| 2002/0031162 A1* | 3/2002 | Huonker | H01S 3/042 372/70 |
| 2003/0025987 A1 | 2/2003 | Erhard et al. | |
| 2003/0189959 A1* | 10/2003 | Erbert | H01S 3/0057 372/25 |
| 2006/0108050 A1 | 5/2006 | Satake et al. | |
| 2007/0007280 A1* | 1/2007 | Bayerer | H01L 23/36 219/604 |
| 2008/0175288 A1 | 7/2008 | Vetrovec | |
| 2010/0303120 A1 | 12/2010 | Yamamoto et al. | |

FOREIGN PATENT DOCUMENTS

| | | |
|---|---|---|
| DE | 10038006 A1 | 2/2002 |
| EP | 1178579 A2 | 2/2002 |
| EP | 1670104 A1 | 6/2002 |
| JP | 4879733 B2 | 2/2012 |

OTHER PUBLICATIONS

Voss, Andreas, Extended English Abstract of "Der Scheibenlaser: Theoretische Grundlagen des Dauerstrichbetriebs und erste experimentelle Ergebnisse anhand von Yb:YAG", University of Stuttgart Dissertation, Stuttgart University, 14 pages, 2002.

International Search Report from corresponding PCT Application No. PCT/EP2013/067085, mailed Nov. 11, 2013, 6 pages.

* cited by examiner

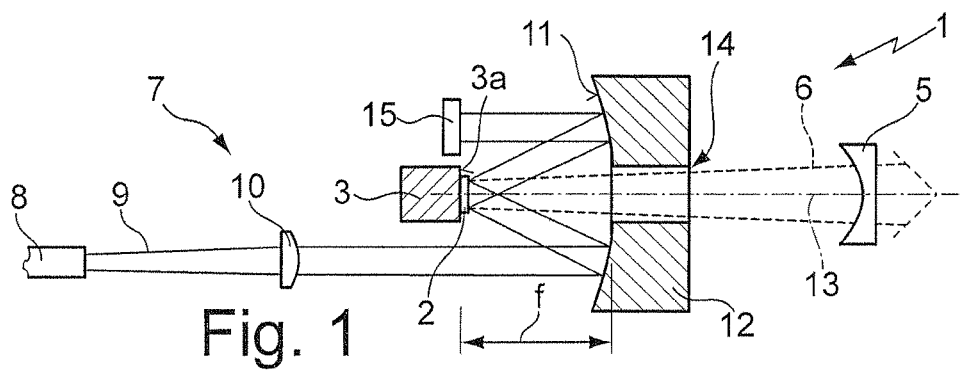
Fig. 1
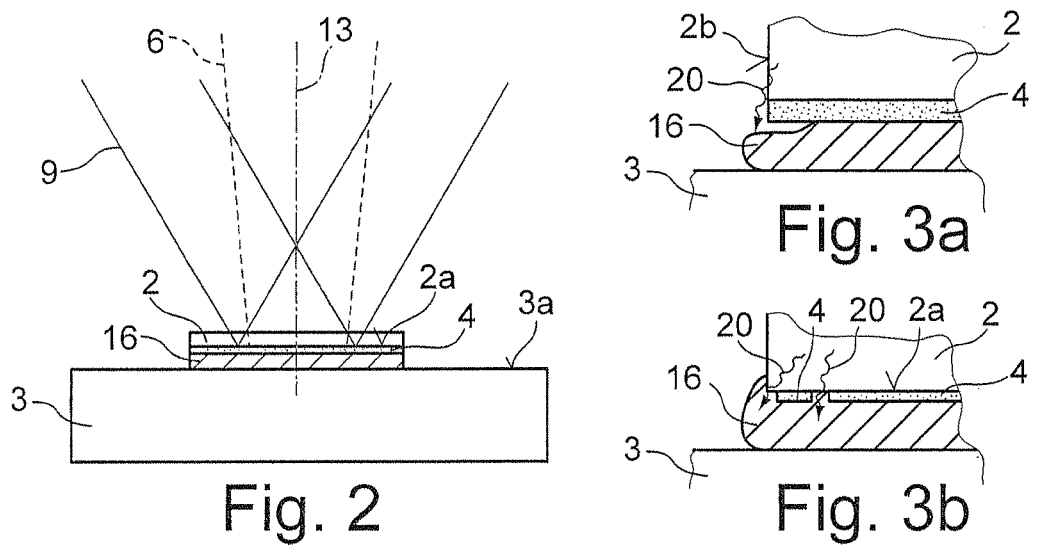
Fig. 2
Fig. 3a
Fig. 3b
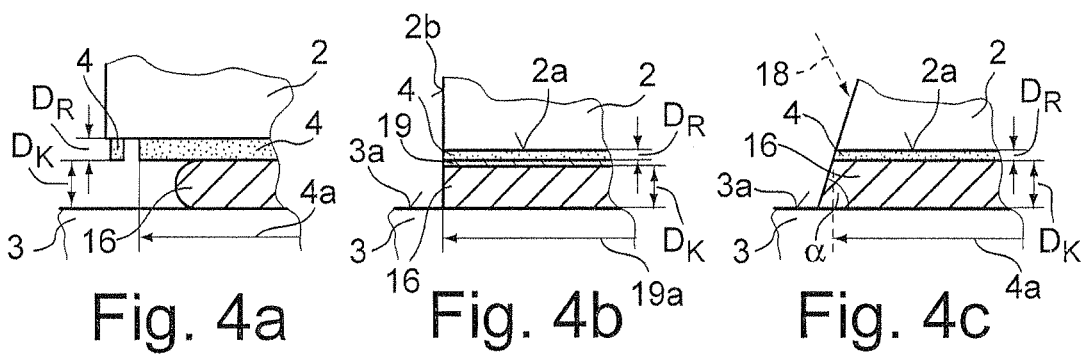
Fig. 4a
Fig. 4b
Fig. 4c
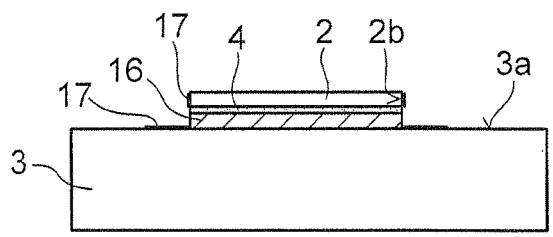
Fig. 5

SOLID-STATE LASER

CROSS-REFERENCE TO RELATED APPLICATION

This application is a continuation of and claims priority under 35 U.S.C. §120 to PCT Application No. PCT/EP2013/067085 filed on Aug. 15, 2013, which claimed priority to German Application No. DE 10 2012 214 971.6, filed on Aug. 23, 2012. The contents of both of these priority applications are hereby incorporated by reference in their entirety.

TECHNICAL FIELD

The present disclosure relates to a solid-state laser and methods for producing the same

BACKGROUND

An example of a solid-state laser is disclosed, for example, in EP1178579A2. In that example, in order to discharge heat from a plate-like solid body to a heat sink (known as the cooling body), it is proposed that the side of the plate-like solid body facing the heat sink be mechanically and thermally coupled to the carrier face formed on the heat sink by an adhesive layer. The adhesive layer is produced from an adhesive which changes from a fluid state into a solid, cross-linked state in a substantially volume-invariable manner. The adhesive layer has an active adhesive layer region with a thermal resistance of less than 10 K mm$^2$/W. This solution is intended to ensure that the solid body is fixed to the heat sink securely and without significant mechanical deformations and that no reduction of the heat flow from the solid body into the heat sink occurs as a result of the adhesive layer.

A solid-state laser arrangement as described above is suitable for producing high laser powers in the kilowatt range. Owing to the small thickness of the plate-like solid body, however, when the laser medium is pumped with a single pass of pump radiation, only a little pump radiation is absorbed. In order to increase the efficiency of such a solid-state laser arrangement, the pump radiation can be redirected several times and reflected back to the plate-like solid body. In this instance, the pump radiation can be focused several times, for example, at a parabolic mirror onto the plate-like solid body, as described, for example, in DE 100 05 195 A1. Owing to the multiple redirections, a laser power of approximately 2 kW or more can be produced.

With such high power of the laser radiation, the plate-like solid body or the laser-active solid-state medium, despite the cooling, is placed under a high thermal load. Since the pump radiation is generally focused only in a portion of the entire volume on the plate-like solid body, the pump radiation field, and consequently also the heat produced, is concentrated on this portion of the volume, whereas, in an edge region of the plate-like solid body, the coupled pump output or the pump radiation field is significantly weaker. Owing to the differences in the strength of the pump radiation field and accordingly also the laser radiation field produced in the active laser medium, significant thermal loads occur particularly in the edge regions of the plate-like solid body and may lead to erosion of the solid-state medium in the edge regions and may consequently lead to an impairment of the effectiveness of the solid-state laser arrangement and potentially to complete failure of the solid-state laser arrangement.

SUMMARY

In general, according to one aspect, the present disclosure encompasses solid-state laser arrangements that can withstand high thermal loads, and methods for producing the same.

More particularly, the present disclosure encompasses a laser amplification arrangement, in which the adhesive layer is completely shielded from radiation from the plate-like solid body by a radiation-impermeable region that is formed between the side of the plate-like solid body facing the adhesive layer and the carrier face of the heat sink. Complete shielding in the context of this application is intended to be understood to mean that there is no direct (e.g., linear) line-of-sight between the solid body and the adhesive layer. That is to say, the adhesive layer is completely shadowed or shielded by the radiation-impermeable region.

The inventors have found that the problems described above (e.g., loss of effectiveness and/or complete failure of the solid-state laser arrangement) with high thermal loading of the plate-like solid body are brought about by an absorption of the laser radiation by the adhesive of the adhesive layer. The laser radiation absorbed is typically a so-called spontaneous or amplified spontaneous emission (ASE) and/or (undesirable) laser modes that are brought about thereby, in which the radiation propagates in a lateral direction in the plate-like solid body and is emitted from the solid body. The adhesives typically used for the adhesive layer are not transparent or are not completely transparent for the wavelength of the pump radiation or the laser radiation produced in the laser-active medium (for example, in the infrared (IR) or visible range), resulting in an absorption of laser radiation in the adhesive and consequently a degradation of the adhesive layer. This may, among other things, lead to reduction of the thermal conductivity of the adhesive layer and consequently to reduction of the heat flow from the plate-like solid body to the heat sink.

The inventors have also recognized that such a degradation of the adhesive layer occurs substantially in the edge regions of the plate-like (typically disc-like) solid body. This is because, at the edge of the solid body, the adhesive may not wet the solid body over the full surface-area, such that the adhesive layer may protrude beyond the plate-like solid body or the reflective coating may have holes or gaps. In particular, lateral protrusion of the adhesive layer beyond the edge of the solid body has been found to be problematic. Removal of the portion of the adhesive layer which protrudes beyond the edge of the solid body by conventional cleaning steps also may not completely solve this problem since even the smallest residues of adhesive may be problematic. For example, a layer of carbon which is approximately 1 nm thick may lead to complete erosion of the edge of the solid body.

It is therefore proposed to form a radiation-impermeable region between the solid body and the heat sink in order to protect the adhesive layer completely, including at the edges, from laser radiation from the plate-like solid body.

Preferably, the radiation-impermeable region contains a reflective coating region, in which the region is applied to the plate-like solid body in a continuous manner. For example, the reflective coating is applied to the solid body without holes, gaps or the like through which the adhesive can enter. The term "continuous" is intended to be understood to mean that, in the relevant region, there may be relatively small defects (coating defects) with a maximum lateral dimension from 10 µm to 20 µm, through which the adhesive can enter. In the case of defects of the coating which do not exceed this lateral dimension, the heat connection is still sufficient. That is to say, although the adhesive is locally heated, there is still no degradation of the adhesive. Preferably, the reflective coating has a high level of reflectivity for the pump radiation (and also for the laser radiation produced in the laser-active medium) so that in a region in which the coating is applied without gaps, the coating is impermeable to radiation or has a sufficiently high shielding action for the laser radiation. Preferably, the adhesive layer is applied only inside the radiation-impermeable region of the reflective coating between the plate-like solid body and the heat sink.

In some embodiments, the radiation-impermeable region contains a continuous region of an absorber layer that is applied between the plate-like solid body and the adhesive layer. The absorber layer can be applied directly to the reflective coating or can be fitted between the reflective coating and the plate-like solid body. In the latter case, the surface region in which the pump radiation strikes (that is to say, the region of the pump spot) must not be provided with the absorber layer. In other words, the absorber layer is applied to the plate-like solid body only, for example, in an annular edge region. On the annular absorber layer, the reflective coating may then be applied over the entire surface of the solid body facing the adhesive layer. Alternatively when the reflective coating is applied, the region in which the absorber layer is applied may be recessed or the reflective coating and the absorber layer may partially overlap where applicable.

The absorber layer contains a material that absorbs the laser radiation emitted from the solid body. The material of the absorber layer preferably has the lowest possible thermal resistance to ensure good thermal coupling with the heat sink. It is possible to use, for example, chromium as a material for the absorber layer. As described above, the absorber layer may be applied to the solid body outside the pump spot, which has the advantage that amplified spontaneous emissions can be suppressed. The absorber layer may be applied to the reflective coating over the entire surface. It is also possible for a continuous region of the reflective coating and a continuous region of the absorber layer to complement each other to form the region that is impermeable to the laser radiation, in which the regions of the coating and the absorber layer are applied in a continuous manner to completely or partially overlap one another.

In some embodiments, the radiation-impermeable region of the reflective coating and/or the absorber layer terminates flush with the plate-like solid body, that is to say, the reflective coating and/or the absorber layer is applied over the entire surface (and in a coherent manner) onto the side of the solid body facing the heat sink. The application of the (e.g., dielectric) reflective coating or the absorber layer is carried out by a coating process such as, for example, by deposition from the gas phase (e.g., through sputtering or other physical vapor deposition (PVD) process). Due to the coating process or the handling of the plate-like solid body after application of the coating, the coating is typically not applied over the entire surface, such as in the direct vicinity of the peripheral edge and has gaps or holes at that location. In order to obtain a reflective coating or an absorber layer which extends in uninterrupted continuous manner as far as the peripheral edge, the plate-like solid body can be cut at the edge side so that the region in which the reflective coating or the absorber layer is not applied is separated and completely removed. The edge-side cutting of the plate-like solid body is also advantageous to remove any discontinuities which may be present at the edge of the plate-like solid body and which may lead to undesirable mechanical loads.

In an advantageous development, the adhesive layer also extends as far as the peripheral edge of the plate-like solid body and terminates flush with the plate-like solid body, more precisely with the peripheral edge thereof. Typically, despite the use of an adhesive which changes from a fluid state into a solid state with substantially no variation of volume, a conventionally produced adhesive connection does not provide a flush termination with the edge of the plate-like solid body. This is because, on the one hand, when the solid body is placed on the heat sink, the adhesive is displaced and, on the other hand, the surface tension of the adhesive or inadequate wetting inhibits a flush termination. For the purposes of this disclosure, flush termination is understood to be a maximum spacing between the adhesive layer and the peripheral or conically extending edge of the plate-like solid body of less than 10 µm, less than 5 µm, or less than 2 µm.

To produce flush termination of the adhesive layer, it is possible to remove material from the edge side on the plate-like solid body after the bonding to the heat sink (and after the adhesive has dried), in which the protruding adhesive layer and the reflective coating are cut at the edge side. After the material removal, which is typically carried out at an angle with respect to the carrier face of the heat sink, a peripheral edge of the plate-like solid body generally forms with the side of the solid body facing the adhesive layer an inclination angle which is different from 90° and which is typically between approximately 10° and approximately 80°. After the removal operation, the peripheral edge of the solid body typically forms a chamfer or is frustoconical. The same applies to the layer of adhesive which is in alignment with the solid body so that it is protected from radiation from the plate-like solid body by means of the reflective coating or by the absorber layer. Optionally, material of the heat sink may also be removed in the region of the carrier face to ensure that the adhesive layer can be completely removed. To achieve flush termination of the adhesive layer with the peripheral edge of the plate-like solid body, a protruding region of the adhesive layer may also be removed by use of a solvent (for example, with acetone, methanol, nitromethane, methylpyrrolidone, isopropanol, among others) or by incineration using, e.g., an oxygen-containing plasma (plasma-supported reactive ion-etching).

In some embodiments, a stop layer is applied to a portion of the carrier face in which the adhesive layer is not applied, and/or to a peripheral edge of the plate-like solid body for preventing the wetting by the adhesive layer. By providing the stop layer for the adhesive, the undesirable wetting of regions of the carrier face to which no adhesive is intended to be applied can be prevented. The wetting of the peripheral edge of the plate-like solid body with adhesive can also be prevented or greatly reduced using an adhesive stop layer. When the adhesive has hydrophobic properties (for example, if it contains a hydrophobic solvent), a hydrophilic material can be used as a stop layer (or anti-bonding layer) or, alternatively, when the adhesive has hydrophilic properties, a hydrophobic material can be used as the stop layer. To prevent wetting by conventional adhesives, the following example materials are particularly advantageous: resists, specifically photoresists, and/or polymer compounds such as, for example, polymethyl methacrylate (PMMA) and hexamethyldisilazane (HMDS). Residues of adhesive which have been deposited on the stop layer may generally be removed from the stop layer where applicable. The stop layer, after the adhesive layer has been applied and hardened, can be removed where applicable from the peripheral edge of the solid body or the carrier face using, for example, a solvent such as acetone.

In some embodiments, the solid-state laser arrangement further includes a focusing device for focusing pump radiation onto the plate-like solid body. It is, for example, possible to use a focusing mirror, such as a parabolic mirror as the focusing device. Using such a focusing mirror, which has a plurality of reflection regions, the pump radiation can pass several times through the plate-like solid body and, in this manner, the effectiveness of the arrangement can be increased. To achieve a high output power of, for example, 2 kW and more, the plate-like solid body can be heated to temperatures of more than 360 K, more than 400 K or optionally 500 K or more.

The reflective coating typically has a dielectric material, fluorides or oxides of metals or semi-metals having been found to be particularly suitable coating materials. The reflective coating may have a single layer of a dielectric material, but a multi-layer coating is generally used and typically has alternating layers of two materials with different refractive indices which, as a result of interference effects, have a powerfully reflective action for the laser radiation. The reflective coating may have a particularly high reflection (of 99.9% or more) both for the pump radiation and for the laser radiation produced by the laser-active medium. Optionally, the reflective coating may also have two reflective layers or multi-layer systems which are optimized for the reflection of the pump radiation or the laser radiation produced in the active medium.

In some embodiments, the reflective coating has a thickness between approximately 1 µm and approximately 10 µm. Limiting excessively large thicknesses is advantageous so the heat flow through the reflective coating is not excessively reduced. However, reflective coatings with larger thicknesses may also be used. Optionally, the reflective coating may have a thickness of less than 1 µm, so long as it has a sufficiently high level of reflectivity R (typically of at least 99.9%). The reflective coating may have a constant thickness, but the thickness of the reflective coating may also vary depending on location—typically within the limits mentioned above.

In some embodiments, the adhesive layer has a thickness of less than 5 µm, less than 1 µm, less than 0.5 µm, or less than 0.01 µm. The thinner the adhesive layer is, the more effectively heat can be discharged from the plate-like solid body.

In some embodiments, the adhesive of the adhesive layer is selected from a group that includes silicate adhesives, acrylate adhesives and dual-component adhesives, in particular epoxy resin adhesives. Epoxy resin adhesives are formed as two components from resin and hardener. Acrylate adhesives are chemically hardening polymerization adhesives, such as methylmethacrylate adhesives or cyan acrylate adhesives. Inorganic adhesives, such as silicate adhesives, can also be used to form the adhesive layer. It is also possible to use an adhesive that has a thermal resistance of less than 10 K mm$^2$/W, that is free from fillers or which has a filler, a shearing strength of more than 5 N/mm$^2$.

In some embodiments, the material of the heat sink is selected from the group that includes carbides (e.g., SiC or AgC), metals (e.g., copper or CuW), diamond and diamond-containing materials. The heat sink should include a material with good thermal conductivity. This property is typically fulfilled by metals, diamond or diamond-containing (composite) materials (e.g., diamond-metal composite materials such as copper/diamond composite materials), and carbides. Water cooling can be provided to the lower side of the heat sink to discharge heat from the heat sink. It is possible for the flow rate with impingement cooling ("water shower") to be, for example, between approximately 300 liter/hour and approximately 800 liter/hour. Other cooling techniques can be used as a cooling connection to the heat sink including, for example, microchannel coolers, heatpipes or direct cooling using a refrigerating medium.

The plate-like solid body or the laser-active medium may, for example, have a host crystal which is selected from the group that includes YAG, YVO$_4$, YO$_3$, Sc$_2$O$_3$, Lu$_2$O$_3$, KGdWO4, KYWO4, YAP, YALO, GGG, GSGG, GSAG, LBS, GCOB, FAP, SFAP, and YLF. These host crystals may each be doped with Yb$^{3+}$, Nd$^{3+}$, Ho, or Tm$^3$+, among others, as an active material. In particular, the solid body or the laser-active medium may also be formed as a semi-conductor hetero-structure and include the materials GaAS and derivatives such as AlInGaAs or GaAsInN, InP and the derivatives thereof, GaN and derivatives such as AlInGaN, GaP and derivatives such as AlGaInP, InSb and the derivatives thereof, and/or SbTe and derivatives thereof.

In general, in another aspect, the present disclosure relates to methods for producing a laser amplification arrangement as described herein, in which the methods include the steps of: applying a reflective coating to a plate-like solid body, applying an adhesive layer between the plate-like solid body and a heat sink, and forming a radiation-impermeable region between the side of the plate-like solid body facing the adhesive layer and the carrier face of the heat sink.

In some implementations, in order to form the radiation-impermeable region, a continuous region of the reflective coating is formed on the solid body. As explained above, the adhesive layer can be effectively shielded from radiation from the solid body in the region where the reflective coating is formed.

In some implementations, in order to form the radiation-impermeable region, an absorber layer is applied to the solid body and/or to the reflective coating. The absorber layer can be applied to the reflective coating over the entire surface, but it is optionally also possible to apply the absorber layer to the reflective coating or to the solid body only in a radially outer edge region, where the reflective coating has gaps. In particular, the application of the absorber layer to the solid body in a region located outside of the pump spot may be advantageous since the absorber layer contributes to the reduction of spontaneous emissions in the solid body.

In some implementations, the methods further include: producing an adhesive layer which terminates flush with the plate-like solid body by removing an edge of the plate-like solid body together with the adhesive layer. In these implementations, the plate-like solid body is cut together with the adhesive layer (and the reflective coating and where applicable the absorber layer) at the edge side after it has been applied to the heat sink. The edge-side removal is carried out by a method which is suitable for material removal in the thickness direction of the plate-like solid body and which produces on the solid body a cut edge which is typically inclined relative to the carrier face of the heat sink. To this end, it is possible to use a thermal removal method (for example, ablation method) using a beam tool, such as a laser, but a mechanical material removal is also possible. In the case of edge-side cutting, a portion of the material of the heat sink on the carrier face may also be removed to ensure that the adhesive layer has been completely removed. Optionally (for example, for decentering), an edge-side material removal on the plate-like solid body can also take place before the application of the plate-like solid body to the heat sink.

In some implementations, the methods comprise: applying an adhesive stop layer to a portion of the carrier face, in which the adhesive layer is not provided on the portion, and/or to the peripheral edge of the plate-like solid body to prevent the wetting during subsequent application of the adhesive layer. Using the adhesive stop layer, it is possible to prevent the adhesive layer from protruding beyond the plate-like solid body. As described herein, the adhesive stop layer can be removed using a solvent after solidification or hardening of the adhesive to prevent radiation from the solid body being absorbed by the adhesive stop layer.

Alternatively or additionally, a portion of the adhesive layer protruding beyond the plate-like solid body can be removed by a solvent such as, for example, acetone, and/or by an etching process, for example, by incineration using an oxygen-containing plasma. When the protruding portion is removed, however, the adhesive may not be completely removed. That is to say, adhesive residues may generally remain on the carrier face or on the peripheral edge.

Other advantages will be appreciated from the description and the drawings. The features mentioned above and those set out below may also be used individually per se or together in any combination. The embodiments shown and described are not intended to be understood to be a conclusive listing but are instead of exemplary character for describing the invention.

BRIEF DESCRIPTION OF THE DRAWINGS

FIG. 1 is a schematic illustration of a solid-state laser arrangement in the form of a disc laser.

FIG. 2 is a schematic illustrating further detail of the arrangement of FIG. 1 with a laser disc fixed to a heat sink by an adhesive layer, FIGS. 3a and 3b are schematics illustrating an edge region of a laser disc, on which scattered radiation from the laser disc can reach an adhesive layer, FIGS. 4a-c are schematics illustrating an edge region of the laser disc of FIG. 2, in which the adhesive layer is protected or shielded from laser radiation by means of a radiation-impermeable region, and FIG. 5 is a schematic illustrating further detail of the arrangement of FIG. 1, with an adhesive stop layer.

DETAILED DESCRIPTION

FIG. 1 is a schematic illustrating a solid-state laser arrangement in the form of a disc laser 1, which has a plate-like solid body 2 (subsequently also referred to as a laser disc) as a laser-active medium that is arranged for cooling on a heat sink 3, more specifically on a carrier face 3a of the heat sink 3. At the side 2a of the laser disc 2 facing the heat sink 3 (see FIG. 2), a reflective coating 4 is applied and, together with a partially permeable decoupling mirror 5, forms a resonator for laser radiation 6. The laser radiation 6 is produced by excitation of the laser-active medium in the laser disc 2 and leaves the resonator through the partially permeable decoupling mirror 5, as indicated in FIG. 1 by means of an arrow.

To excite the laser-active medium of the laser disc 2, the disc laser 1 has a pump light arrangement 7 with a pump light source 8 that produces an initially divergent pump light beam 9. The pump light beam 9 is collimated on an optical collimation system, which is illustrated for reasons of simplification in FIG. 1 in the form of a single lens 10. The collimated pump light beam 9 strikes a reflective face 11, which is formed on a concave mirror 12. The reflection face 11 extends in a rotationally symmetrical manner with respect to a center axis 13 of the concave mirror 12 and is curved in a parabolic manner, that is to say, the concave mirror 12 forms a parabolic mirror. The collimated pump light beam 9 extends parallel with the center axis 13 of the concave mirror 12. The concave mirror 12 further has a center opening 14 for introduction for the laser radiation 6 which is produced in the laser disc 2 as laser-active medium.

The collimated pump light beam 9 is reflected on the parabolic reflection face 11 and focused on the plate-like solid body 2, which is arranged at the focal point or the focal plane of the concave mirror 12 (with a focal distance f). In this instance, a beam exit face of the pump light source 8 is imaged on the laser-active medium or on the plate-like solid body 2 in the focal plane at an imaging scale, which is determined by the focal distance f of the parabolic mirror 12 and the focal distance (not shown) of the collimation lens 10. The production of the collimated pump light beam 9 can also be carried out in another manner.

The pump light beam 9 is reflected on the reflective coating 4 at the rear side of the laser disc 2, strikes the reflection face 11 in a divergent manner and is reflected again. In this instance, the reflected pump light beam 9 is collimated as a result of the parabolic geometry of the reflection face 11 and subsequently strikes a redirection device 15. The redirection device 15 is in the form of a planar mirror, which is arranged in a plane perpendicular to the center axis 13. Upon striking the redirection device 15, the light beam 9 is reflected back in itself thereon.

In the pump diagram, which is described above in connection with FIG. 1, it has not yet been described that the pump light beam 9, after striking the reflection face 11 for the first time and after striking the reflection face 11 for the last time, is redirected several times between reflection regions, which are formed on the reflection face 11 and which are arranged in different angular ranges about the center axis 13. These angular regions of the parabolic mirror 12 extend in the peripheral direction around the center axis 13 and may be of the same size.

The pump light beam 9, which is collimated by means of the lens 10 strikes—as shown in FIG. 1—the reflection face 11 in a first reflection region, is redirected from there to the laser disc 2 and from the laser disc 2 or the reflective coating 4 which is applied thereto to a second reflection region in another angular range on the reflection face 11. This process can be repeated several times until the pump beam 9 is reflected back in itself by the planar mirror 15. The redirection between the reflection regions of the reflection face 11 can be carried out by redirection devices which are not illustrated, for example, in the form of (bi)prisms. For details of the redirection between different reflection regions of the parabolic mirror 12, reference may be made to DE 100 05 195 A1 which is incorporated by reference in its entirety.

As can be seen in FIG. 2, the plate-like solid body 2 is connected to the carrier face 3a of the heat sink 3 by an adhesive layer 16. Adhesive layer 16 may be constructed as described in EP 1 178 579 A2, which is incorporated by reference in its entirety. The adhesive layer 16 in the present example is constructed as an epoxy resin adhesive layer, but other types of adhesives, for example, silicate adhesives or acrylate adhesives, can also be used for the present application.

In the arrangement shown in FIG. 2, particularly high temperatures in the laser disc 2 may be achieved as a result of the multiple cycles of the pump radiation 9. The temperatures may be more than 360 K, optionally more than 400 K or even approximately 500 K. In the laser amplification arrangement described in EP 1 178 579 A2, the adhesive layer 16 typically does not terminate flush with the peripheral edge 2b of the laser disc 2, as illustrated with reference to FIGS. 3a,b.

FIG. 3a shows the peripheral edge 2b of the laser disc 2 with the adhesive layer 16, which does not bond to the reflective coating 4 in the region of the peripheral edge 2b or does not completely wet it, so that the adhesive layer 16 protrudes laterally beyond the edge 2b of the laser disc 2. The adhesive layer 16 further extends onto a portion of the carrier face 3a, which is not covered by the laser disc 2 so that the adhesive layer 16 is struck by radiation 20 from the solid body 2. FIG. 3b shows in a similar manner an adhesive layer 16 which protrudes laterally beyond the edge 2b of the laser disc 2. The adhesive layer 16 illustrated in FIG. 3b additionally bonds to the peripheral edge 2b of the laser disc 2 and being subjected at that location to radiation 20 from the solid body 2. In FIG. 3b, it is also possible to see a reflective coating 4 which is interrupted in the vicinity of the edge 2b and has at that location a gap in which the adhesive layer 16 has been introduced so that it comes into direct contact with the lower side 2a of the laser disc 2 and is also subjected to radiation 20 from the solid body 2.

Although the region shown in FIGS. 3a,b is located outside a volume area of the laser disc 2 (shown in FIG. 2) in which the pump radiation 9 strikes or in which the radiation field of the laser radiation 6 produced in the laser-active medium 2 is formed, the edge region of the adhesive layer 16 shown in FIGS. 3a,b is nonetheless also subjected to the radiation 20 produced in the laser disc 2 by amplified spontaneous emissions. The laser radiation field present in the vicinity of the edge 2b of the laser disc 2 can lead to degradation of the adhesive layer 16, which, in turn, can lead to a reduction of the effectiveness and to erosion of the laser disc 2 in the edge region shown in FIGS. 3a,b.

To prevent degradation of the adhesive layer 16 in the arrangement shown in FIG. 2, the adhesive layer 16 is fully shielded by a radiation-impermeable region 4a, 19a, as described below with reference to FIGS. 4a-c.

The reflective coating 4 shown in FIG. 4a has a radiation-impermeable, continuous coherent region 4a, which does not extend as far as the lateral edge 2b of the laser disc 2. The lateral extension of the adhesive layer 16 is in this example is limited to the radiation-impermeable region 4a. In the example shown in FIG. 4a, the adhesive layer 16 does not even extend as far as the edge of the radiation-impermeable region 4a, but instead is spaced-apart from this edge or recessed relative thereto, so that the radiation-impermeable region 4a protrudes laterally beyond the adhesive layer 16. The spacing of the adhesive layer 16 with respect to the edge of the radiation-impermeable region 4a is in this example advantageously at least as large as the spacing with respect to the peripheral edge 2b of the laser disc 2. In this manner, it is possible to prevent laser radiation from reaching the region of the adhesive layer 16 through the gap in the reflective coating 4 or from the region of the edge 2b of the laser disc 2.

To prevent the adhesive layer 16 from protruding beyond the radiation-impermeable region 4a of the reflective coating 4 in the arrangement shown in FIG. 4a, a precisely metered quantity of adhesive should be used to form the adhesive layer 16. It has been found to be particularly advantageous in this instance to use an adhesive with a filler that has particles with a defined dimension. In this manner, when the laser disc 2 is pressed against the carrier face 3a of the heat sink 3, an adhesive layer 16 with a defined (constant) thickness DK can be produced, which corresponds to the dimension of the (for example, spherical) particles of the filler. The thickness DK of the adhesive layer 16 should be as small as possible in order to enable good heat flow to the heat sink 3. In particular, the adhesive layer may have a thickness of less than 5.0 μm, less than 1.0 μm, less than 0.5 μm, or even less than 0.01 μm.

The reflective coating 4 advantageously has a thickness DR between 1 μm and 10 μm. The reflective coating 4 may include a single layer but the coating 4 is generally a multi-layer system which, as a result of interference effects, enables a particularly high reflectivity (for example, of more than 99.9%) for the laser radiation 6 produced in the laser-active medium 2. Dielectric coating materials include, for example, fluorides or oxides.

In the example shown in FIG. 4b, an absorber layer 19 is applied to the reflective coating 4 and terminates flush with the reflective coating 4, the adhesive layer 16 and the peripheral edge 2b of the solid body 2. The absorber layer 19 in the present example is formed by chromium and has sufficient thickness to absorb radiation from the inner side of the solid body 2 so that the radiation does not strike the adhesive layer 16.

The absorber layer 19 forms a radiation-impermeable region 19a that extends as far as the edge 2b and covers gaps in the reflective coating 4 (which are not illustrated in FIG. 4b).

In contrast to what is shown in FIG. 4b, the absorber layer 19 may be applied between the reflective coating 4 and the solid body 2. The absorber layer 19 in this case is applied only in a radially outer edge region of the solid body 2 and the region of the solid body 2 in which the pump light beam 9 shown in FIG. 2 strikes is omitted. The radiation-impermeable region may in this case be formed by a combination of a radially inner region of the reflective coating 4, in which the inner region is applied in a continuous manner, and a radially outer region of the absorber layer 19, in which the outer region is applied in uninterrupted continuous manner. However, it is also possible for the reflective coating 4 to be applied over the complete surface of the solid body 2 so that the reflective coating 4 and the absorber layer 19 overlap in the radially outer edge region. In regions in which both the reflective coating 4 and the absorber layer 19 are applied, it is sufficient for either the reflective coating 4 or the absorber layer 19 to be applied in uninterrupted continuous manner. If, for example, the reflective coating 4 is applied in uninterrupted continuous manner, the absorber layer 19 may have gaps and vice versa.

In the embodiment shown in FIG. 4c, the radiation-impermeable region 4a of the reflective coating 4 also terminates flush with the peripheral edge 2b of the plate-like solid body 2. The adhesive layer 16 also terminates in this embodiment flush with the peripheral edge 2b of the plate-like solid body 2. The flush termination which is shown in FIG. 4c is enabled by a removal method, in which a thermal processing beam 18 orientated at an angle relative to the carrier face 3a cuts the laser disc 2 together with the reflective coating 4 and the adhesive layer 16 at the edge side. In this manner, it is not only possible to remove the adhesive, which laterally protrudes beyond the laser disc 2, but it is also possible to remove an edge-side region of the reflective coating 4 that is typically applied in a non-coherent manner to the laser disc 2 (see FIG. 3b). After the removal, both the edge 2b of the laser disc 2 and the edge of the reflective coating 4 and the edge of the adhesive layer 16 are conical and these form with the carrier face 3a an angle of inclination a of between approximately 10° and approximately 80°. In the material removal shown in FIG. 4c, the material of the heat sink 3 on the carrier face 3a may also be partially removed in order to completely remove the protruding portion of the adhesive layer 16.

The heat sink 3 is produced from a material with good thermal conductivity. At least in the region of the carrier face 3a, the heat sink may be formed, for example, from diamond or a diamond/metal composite material, but also from a carbide. However, the heat sink 3 can also be produced from another metal material (e.g., copper) or a metal compound (e.g., CuW).

To enable the laser disc 2 to be centered, a material removal may also be carried out where applicable before the laser disc 2 is bonded to the heat sink 3. To produce a reflective coating 4, which is applied to the laser disc 2 over the entire surface and which extends in uninterrupted continuous manner as far as the edge 2b of the laser disc 2, it is also possible to inspect the reflective coating 4 to detect the gaps which are present at that location and optionally selectively fill the gaps with the material of the remaining reflective coating 4 or with another material that has a reflective or absorbing effect.

A flush termination of the adhesive layer 16 or a limitation to the radiation-impermeable region 4a of the reflective coating 4 can also be achieved when, as shown in FIG. 5, a stop layer 17 for preventing the wetting by the adhesive layer 16 is applied to a portion of the carrier face 3a that is not provided for applying the adhesive layer 16 (e.g., directly adjacent to the region in which the laser disc 2 is positioned) and to the peripheral edge 2b of the laser disc 2. The stop layer 17, depending on the type of adhesive, may have hydrophilic or hydrophobic properties. The following materials having been found to be particularly advantageous as a stop layer: resists, particularly photoresists, PMMA, or hexamethyldisilazane (HMDS), among others. The stop layer 17 prevents the wetting by the adhesive or enables residual adhesive that may remain thereon to be removed in a simple manner (generally using a solvent). In particular after the adhesive has hardened, the stop layer 17 can be removed from the carrier face 3a or the peripheral edge 2b using a solvent, for example, acetone, to prevent absorption of radiation from the laser disc 2.

Alternatively or additionally, to remove residual adhesive on portions of surfaces on which a wetting with the adhesive is undesirable, in particular in a region of the adhesive layer 16 protruding beyond the laser disc 2, a solvent can be used and/or an etching process, for example, incineration using an oxygen plasma.

The solid-state laser arrangement 1 described herein can withstand high thermal loads and be operated in a temperature range which is between approximately 270 K and approximately 500 K. The operation in this temperature range enables laser radiation 6 to be produced with an output power of approximately 2 kW or more, when, as in FIG. 1, the pump radiation 9 is subjected to a high number of redirections between different reflection regions. The method described herein can also be carried out with laser discs 2 which have a constant curvature. The geometry of the laser disc 2 is not limited to a round shape; the laser disc 2 may instead also have a square or rectangular geometry.

A number of embodiments have been described. Nevertheless, it will be understood that various modifications may be made without departing from the spirit and scope of the invention. Accordingly, other embodiments are within the scope of the following claims.

What is claimed is:

1. A solid-state laser arrangement comprising:
a plate-like solid body including a laser-active medium;
a heat sink;
an adhesive layer between a carrier face of the heat sink and the plate-like solid body, the adhesive layer terminating flush with a peripheral edge of the plate-like solid body along an edge of the adhesive layer, wherein both the peripheral edge of the plate-like solid body and the edge of the adhesive layer are inclined relative to the carrier face of the heat sink at the same, inclination angle ($\alpha$) that is different from 90°; and
a reflective coating on a side of the plate-like solid body facing the adhesive layer,
wherein the adhesive layer is completely shielded from radiation from the plate-like solid body by a radiation-impermeable region between the side of the plate-like solid body facing the adhesive layer and the carrier face of the heat sink.

2. The solid-state laser arrangement according to claim 1, wherein the radiation-impermeable region comprises a region of the reflective coating extending continuously over the plate-like solid body.

3. The solid-state laser arrangement according to claim 1, wherein the radiation-impermeable region comprises an absorber layer between the plate-like solid body and the adhesive layer.

4. The solid-state laser arrangement according to claim 1, wherein the radiation-impermeable region terminates flush with the plate-like solid body.

5. The solid-state laser arrangement according to claim 1, further comprising a stop layer on the carrier face and/or on the peripheral edge of the plate-like solid body, wherein the stop layer prevents wetting by the adhesive layer.

6. The solid-state laser arrangement according to claim 1, further comprising: a focusing device arranged to focus pump radiation onto the plate-like solid body.

7. The solid-state laser arrangement according to claim 1, wherein the reflective coating has a thickness between 1 μm and 10 μm.

8. The solid-state laser arrangement according to claim 1, wherein the adhesive layer has a thickness of less than 5.0 μm.

9. The solid-state laser arrangement according to claim 1, wherein the adhesive of the adhesive layer is selected from the group consisting of silicate adhesives, acrylate adhesives and dual-component adhesives.

10. The solid-state laser arrangement according to claim 1, wherein the heat sink is composed of a material selected from the group consisting of carbides, metals, diamond and diamond-containing materials.

11. A method for producing a laser amplification arrangement, the method comprising:
applying a reflective coating to a plate-like solid body;
applying an adhesive layer between the plate-like solid body and a carrier face of a heat sink;
forming an radiation-impermeable region between a side of the plate-like solid body facing the adhesive layer and the carrier face of the heat sink; and
removing a portion of each of the plate-like solid body and the adhesive layer so that the adhesive layer terminates flush with the plate-like solid body, and so that a peripheral edge of the plate-like solid body forms an inclination angle ($\alpha$) that is different from 90° with the side of the plate-like solid body facing the adhesive layer.

12. The method according to claim 11, wherein forming the radiation-impermeable region comprises forming a continuous region of the reflecting coating over the solid body.

13. The method according to claim 11, wherein,
forming the radiation-impermeable region comprises applying an absorber layer to the reflective coating and/or to the solid body.

14. The method according to claim 11, further comprising: applying an adhesive stop layer to a portion of the carrier face, and/or to the peripheral edge of the plate-like solid body, wherein the adhesive stop layer prevents wetting of the adhesive layer.

15. The method according to claim 11, further comprising: removing a portion of the adhesive layer protruding beyond the plate-like solid body by a solvent and/or by an etching process.

16. The method according to claim 11, wherein removing the portion of the plate-like solid body and adhesive layer comprises applying a thermal processing beam to the plate-like solid body and adhesive layer.

17. The method according to claim 11, wherein removing the portion of each of the plate-like solid body and the adhesive layer results in both the peripheral edge of the plate-like solid body and an edge of the adhesive layer that is flush with the peripheral edge of the plate-like solid body being oriented at the same non-90° inclination angle ($\alpha$) with respect to the carrier face of the heat sink.

* * * * *